United States Patent [19]

van Cappelle

[11] 4,073,390
[45] Feb. 14, 1978

[54] SHIP LOADING SYSTEM

[75] Inventor: Hendrik Cornelis van Cappelle, Bentveld, Netherlands

[73] Assignee: Hoogovens Ijmuiden, BV, Ijmuiden, Netherlands

[21] Appl. No.: 741,984

[22] Filed: Nov. 15, 1976

[30] Foreign Application Priority Data

Aug. 17, 1976 United Kingdom ............... 34269/76

[51] Int. Cl.² ............................................. B65G 67/58
[52] U.S. Cl. ...................................... 214/14; 198/363; 198/585
[58] Field of Search ............... 198/363, 364, 537, 565, 198/566, 569, 585; 214/14, 15 D, 15 E, 116 R, 10

[56] References Cited

U.S. PATENT DOCUMENTS

| 1,241,053 | 9/1917 | Stuart | 214/14 |
| 1,313,928 | 8/1919 | Stuart | 214/14 |
| 1,339,486 | 5/1920 | Stuart | 198/363 X |
| 2,704,148 | 3/1955 | Burrows | 214/14 X |

FOREIGN PATENT DOCUMENTS

| 2,052,654 | 5/1972 | Germany | 214/14 |
| 2,246,835 | 3/1974 | Germany | 198/585 |

*Primary Examiner*—Frank E. Werner
*Attorney, Agent, or Firm*—Stevens, Davis, Miller & Mosher

[57] ABSTRACT

A ship loading system for loading bulk cargo, e.g. iron ore, at a ship's berth is proposed which has two shiploaders spaced apart along the berth and each shiftable along the berth. The shiploaders are both fed by an endless main conveyor which has trippers at its respective delivery points to the shiploaders, the trippers being shiftable along the berth with the respective shiploaders. At the first tripper, the flow on the main conveyor is switchable without interruption from delivery to the first shiploader and delivery back onto the main conveyor to the second tripper. A system which is highly flexible in operation, and can load a ship continuously without interruption of the flow is thus provided.

11 Claims, 5 Drawing Figures

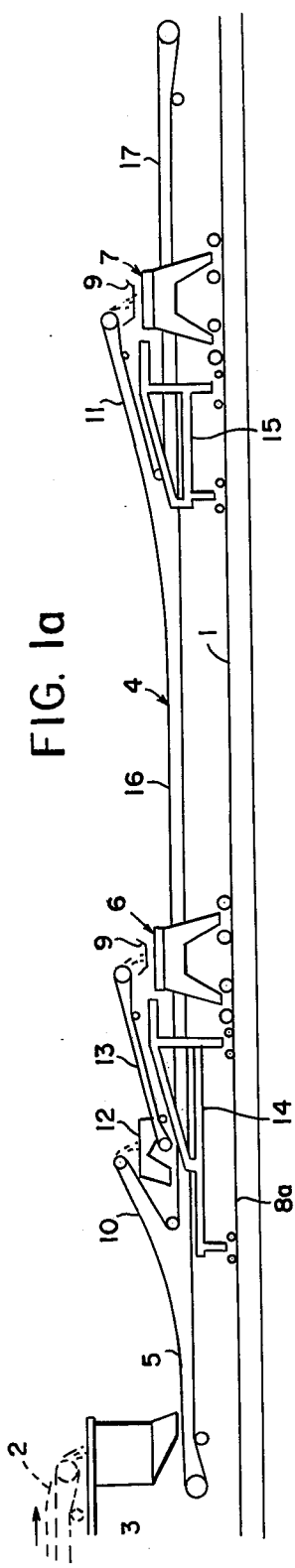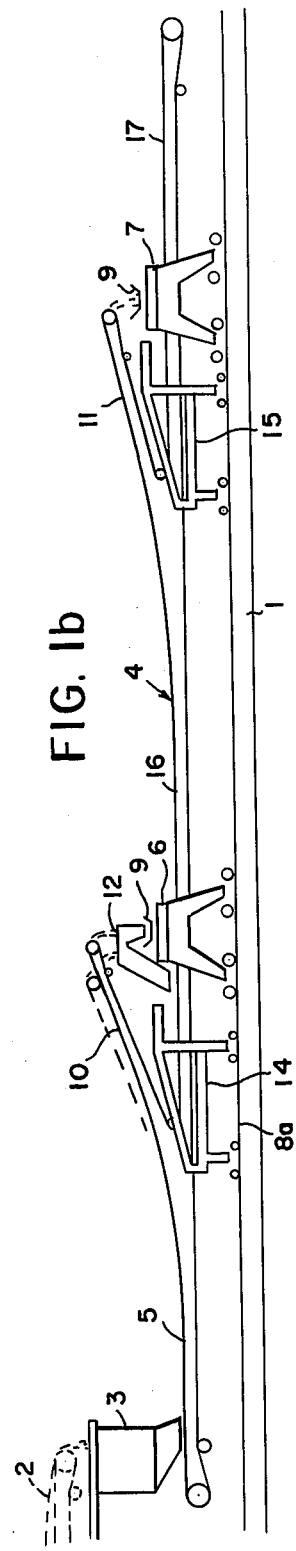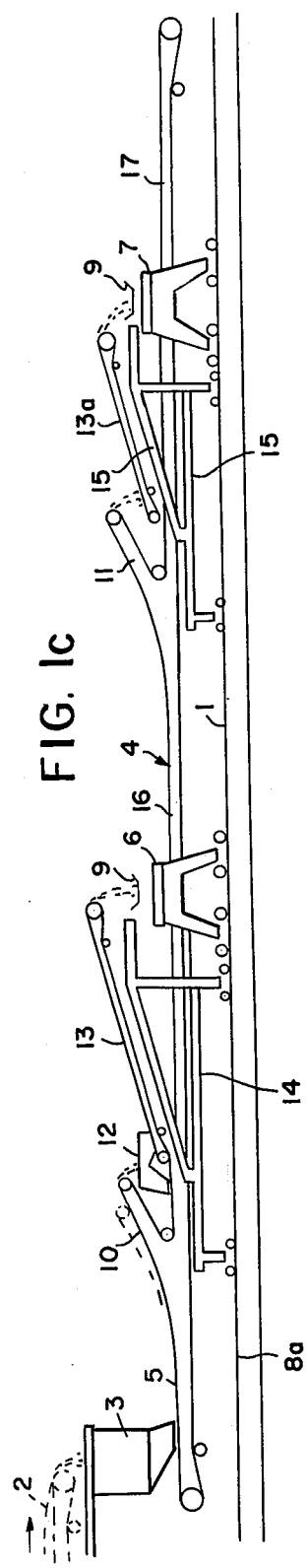

SHIP LOADING SYSTEM

BACKGROUND OF THE INVENTION

1. Field of the Invention

This invention relates to a ship loading system for bulk cargo, particularly cargo which is suitable for continuous conveyance by endless conveyors, e.g. belts. Examples of such cargoes are coal and iron ore either in the form of course or fine granules or in the form of pellets.

2. Description of the Prior Art

Ship loading systems for loading bulk cargo into large ocean-going vessels are known in which there is a single shiploader which is movable along substantially the whole length of the ship's berth, there being a single conveyor supplying the cargo to the shiploader and a tripper in the conveyor for delivery to the shiploader. The tripper moves with the shiploader. See for instance U.S. Pat. No. 3,388,818 and "The Dock and Harbour Authority", Vol. 53, page 255 (November 1972). The disadvantage of such systems is that delivery must be stopped completely when the shiploader is moved from one hold to another and that if the shiploader breaks down, loading is delayed indefinitely.

Other systems are known, in which two shiploaders are provided, both being capable of slewing so as to reach a number of hatches in the ship, but not being bodily shiftable along the ship's berth. An example is the plant installed at the Port of Tubarao, Brazil, described for example in "Fordern und Heben" 23 (1973) No. 7 pages 367, 368 and 24 (1974) No. 13, pages 1221 to 1224. In this case an approach conveyor delivers the cargo onto two separate parallel conveyors which deliver it respectively to the two shiploaders. Disadvantages of this plant are the very large size of the slewing shiploaders, the inability of one of the shiploaders to load the whole ship (without movement of the ship) if the other shiploader breaks down or is under construction, and the number of conveyors required together with the fact that the system is not symmetrical about a longitudinal axis, so that loading on both sides of a quay is not possible.

The reference in "The Dock and Harbour Authority" given above also refers to the possibility of using two slewing loaders or two travelling loaders, though the latter alternative is discounted on economic grounds.

SUMMARY OF THE INVENTION

One object of the present invention is to provide a ship loading system in use of which the berthing time of the ship is as short as possible, which means that large loading rates are required, and wasted time should be avoided.

Another object is to provide a ship loading installation which is reliable and simple. When switching from loading by one shiploader to loading by another or to distribution of the flow over both shiploaders, switching from one belt system to another should be avoided as much as possible, and it should be possible for the supply of the cargo to be continued without interruption. It is particularly important to avoid interruption when a long supply conveyor, e.g. many kilometers, is providing the flow of cargo.

Yet another object is to provide a shiploading system having two shiploaders, each of which can act as a reserve for the other without the necessity for reberthing of the ship, which is time-consuming and risky in an open roadstead.

Yet another object is to provide a ship loading system, in which while the system is being built, it is possible to start loading operations using one shiploader, while a second shiploader is still under construction or will be built in a later stage.

Another object is to provide a ship loading system in which, in suitable cases, loading of ships on both sides of a quay is possible.

According to the present invention there is provided a ship loading system for bulk cargo, having at least two shiploaders for continuous conveyance of the cargo onto the ship and a conveyor system for delivery to the shiploader from a feeding station which may be remote from the berth, but is preferably at one end thereof. The shiploaders are both shiftable along the ship's berth, and the conveyor system comprises an endless main conveyor extending along the berth and having a first tripper at its delivery point to the first shiploader and a second tripper at its delivery point to the second shiploader. A first portion of the conveyor extends from the feeding station to the first tripper and a second portion extends therefrom to the second tripper, the trippers being shiftable along the ship's berth with the respective shiploaders. At the first tripper the flow on the main conveyor is switchable without interruption between delivery to the first shiploader and delivery onto the said second portion for conveyance to the second tripper.

With the system of the invention, a number of advantages can be obtained. The system can be relatively simple; for instance it requires only one conveyor extending along the ship's berth. Continuous loading of the ship is possible since when one of the shiploaders has filled a hold to a sufficient degree, flow can be switched without interruption to the other shiploader for filling of another hold towards the other end of the ship. While the second shiploader is thus operating, the first shiploader together with its tripper can be repositioned to fill another hold in the ship.

Since each shiploader can be shiftable along the berth so as to fill any hold in the ship, each shiploader can act as a reserve for the other, without the necessity for movement of the ship. Either of the shiploaders can be brought into operation while the other is being built or even if not yet built. The system of the invention can be applied to sites where ships are loaded on both sides of the quay.

In a particularly convenient arrangement for switching the flow at the first shiploader without interruption, the first tripper delivers the cargo into a guide hopper having two outlets, a first one of which outlets delivers the cargo onto the first shiploader and the other of which delivers the cargo onto the said second portion of the mains conveyor, the guide hopper and the first tripper being relatively movable between two relative positions in which the flow of cargo respectively passes to the said outlets.

Preferably, the guide hopper has two chute surfaces which diverge downwardly from an apex, and lead respectively to the said two outlets. Thus if desired the flow of the first portion of the main conveyor can be divided by the apex in the guide hopper into two separate flows, which pass respectively to the first and second shiploaders.

Conveniently, in order to transfer the cargo from the main conveyor into the ship, the said first shiploader has an inclined endless conveyor movable therewith, which receives the flow from the first tripper and delivers the flow onto a conveyor extending outwardly over the ship. Both shiploaders may have an inclined conveyor of this kind. Alternatively, the first tripper may raise the cargo to a sufficient height that it can be delivered directly onto the conveyor on the first shiploader extending outwardly over the ship.

So that the shiploaders can be used with ships of different sizes, or for holds on one ship spaced at different distances from the side of the ship, preferably each shiploader is capable of the slewing movement as well as the shifting movement along the ship's berth. This slewing movement is further essential for loading of ships at either side of the quay.

BRIEF DESCRIPTION OF THE DRAWINGS

Several preferred embodiments of the invention will now be described by way of non-limitative example, with reference to the accompanying diagrammatic drawings, in which:

FIGS. 1a, 1b and 1c are side views respectively of three alternative shiploading systems, each embodying the invention;

FIG. 2 is a diagrammatic plan view of the ship loading system of FIG. 1a; and

DESCRIPTION OF THE PREFERRED EMBODIMENTS

Figure 2:
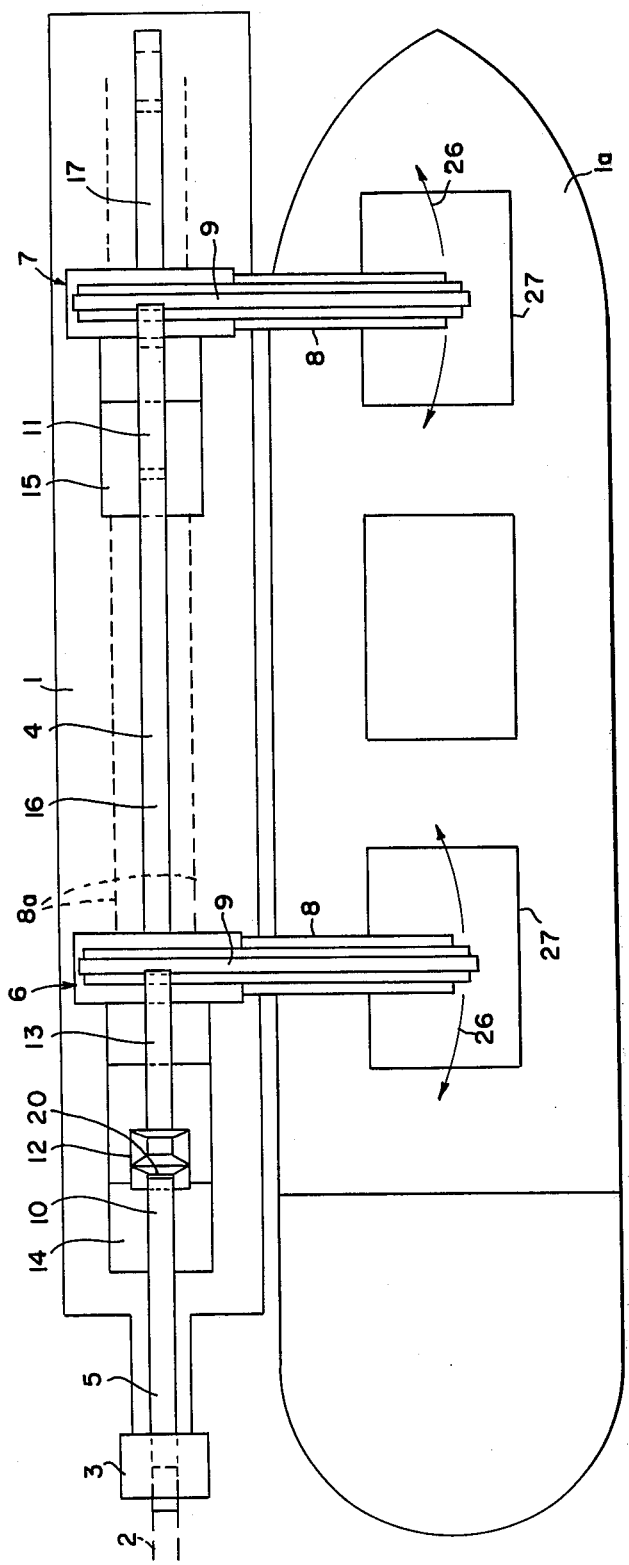

In FIGS. 1a, 1b and 1c, the same reference numerals are used for corresponding parts. The quay 1 providing the ship's berth may be for example an artificial platform constructed in sufficiently deep water. An approach conveyor 2, which may be for instance several kilometers long, or even longer, deposits its flow of cargo into a transfer hopper 3 which can be used as a store for excess flow. The hopper delivers the flow onto the first portion 5 of a main conveyor 4 extending along the quay 1 for a distance which is at least as long as the loading length of the ships which are expected to use the quay. Two shiploaders 6 and 7 cooperate with the main conveyor 4 and are movable along the quay over substantially the whole length of the conveyor 4 on rails 8a. Each shiploader has a main portion 8 in the form of a boom extending outwardly over the ship 1a and carrying a transverse conveyor 9 extending transversely of the main conveyor 4.

For delivery of cargo onto the shiploaders 6, 7, the conveyor 4 has two trippers 10, 11, which in conventional manner each comprise drums which the belt of the conveyor passes round, while the drums are arranged so that the cargo is conveyed up an incline before being deposited from the belt. Each tripper 10, 11 are movable along the conveyor 4 when the respective shiploader is moved. The first tripper 10 delivers the flow into a flow distributing hopper 12 which is described in more detail below. The hopper 12 delivers the flow either onto a short inclined endless conveyor 13 which lifts the flow to a suitable height for delivery into the transverse conveyor 9 of the shiploader 6, or onto a second portion 16 of the conveyor (FIG. 1a). The tripper 10, hopper 12 and conveyor 13 are all mounted on a carriage 14 which is also movable on the rails 8a, and is connected to the shiploader 6.

The tripper 11 of the second shiploader 7 delivers directly into the transverse belt 9, and is mounted upon a carriage 15 also movable on the rails 8a. The second portion 16 of the belt extends from the first tripper 10 to the second tripper 11, and the conveyor 4 extends beyond the second shiploader 7 as a third portion 17. The third portion 17 may extend beyond the region where it is desired to load ships so that the second shiploader 7, and its tripper 11, can be moved out of the way if they are broken down or being repaired, to permit the first shiploader 6, to move over the whole length of the ship. Likewise, room is desirably left for the shiploader 6 to be moved out of the way, so that the shiploader 7 can operate over the whole length of the ship.

Figure 3:
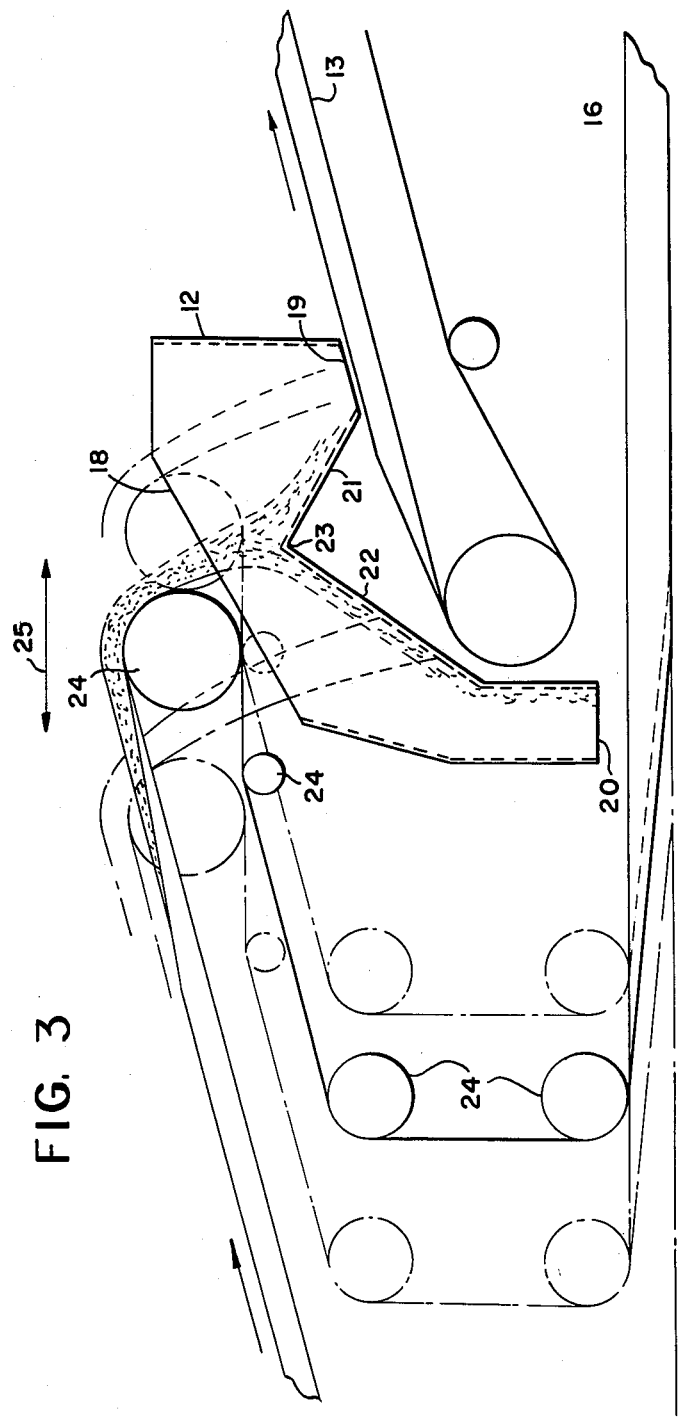
FIG. 3 is a side view on a larger scale of a part of the ship loading system of FIG. 1a, showing the movement of the first tripper relative to the flow distributing hopper.

Referring to FIG. 3, the hopper 12 has an inlet 18 into which the tripper 10 delivers flow whatever its position. The hopper 12 has two outlets 19, 20 respectively located immediately above the conveying run of the conveyor 13 and the second portion 16 of the main conveyor 4. The tripper 10 is movable relative to the hopper 12 between two relative positions in which the flow from tripper 10 falls through the opening 18 onto respective inclined chute surfaces 21, 22 respectively leading downwardly from an apex 23 to the openings 19, 20. In the intermediate relative position of the tripper 10 and hopper 12 shown in full lines, the tripper delivers onto the apex 23, so that the flow is divided between the two outlets 19 and 20. As shown in FIG. 3, the tripper 10 has e.g. four turning drums or rollers 24 each of which is shiftable relative to the hopper 18 so that the tripper moves without altering the overall length of the belt of the conveyor 4.

Movement of the tripper is indicated by the arrow 25, and in the two extreme positions indicated by broken lines, the flow is directed by the chute surfaces 21, 22 either through the outlet 19 or through the outlet 20 of the hopper 12.

The embodiment of FIG. 1b differs from that of FIG. 1a in that the inclined conveyor 13 is omitted, the tripper 10 extending to a greater height and delivering the material directly into a hopper 12 of different shape but similar function to the hopper 12 of FIG. 1a. In FIG. 1b, the hopper 12 delivers directly into the transverse belt 9 on the shiploader 6.

In the embodiment of FIG. 1c, both shiploaders 6 and 7 have inclined belts 13, 13a respectively, delivering into the transverse belts 9. Thus the tripper 11 of the second shiploader 7 delivers onto the belt 13a.

If the approach conveyor 2 is short, it may be possible to dispense with the transfer hopper 3. On the other hand, where the approach conveyor 2 is long, and is provided with a separate drive arrangement, the transfer hopper 3 is needed as storage capacity (of limited size) for the excess flow in the event that the whole conveyor system should be stopped.

As will be appreciated, when both shiploaders 6 and 7 are operating, the arrangement of the relatively movable tripper 10 and hopper 12 permits switching of the flow from the first shiploader 6 to the second shiploader 7 or vice versa without interruption of the flow on the belt conveyor 4.

When only one shiploader is in operation, for instance in the first stage of operation of a new loading facility, the reclaiming system of the bulk storage can be stopped in advance. By this so-called phase shifted operation the stoppage of the whole conveyor system may be avoided as well.

As indicated in FIG. 2 by arrows 26, the booms of the shiploaders 6, 7 may be capable of slewing about a centre of rotation in the centre line of the main conveyor 4, so as to achieve the correct position of the end of the transverse conveyor 9 above the ship hatch 27. Alternatively, the shiploaders 6 and 7 may be fixed at 90° to the longitudinal axis of the ship, and may be provided with a shuttle or other means for axial adjustment permitting variation of the position of the end of the conveyor 9 positioned over the ship relative to the other end.

It will be noted that the main conveyor 4 extends centrally along the quay 1, and serves both shiploaders 6, 7 which have the same length transversely of the ship. Therefore in principle the invention is applicable where the shiploaders are capable of slewing through at least 180° so as to be able to load ships on both sides of the quay, without problems arising because of th asymmetry of the conveyor system or because of differing lengths of the shiploaders.

While the invention has been illustrated above by reference to preferred embodiments thereof, it will be understood by those skilled in the art that various changes may be made without departing from the spirit and scope of the invention and it is intended to cover all such changes and modifications by the appended claims.

What is claimed is:

1. Ship loading system for bulk cargo at a berth for ships, comprising
    (a) at least first and second shiploaders spaced apart along the berth and extending outwardly over the ship during loading, the shiploaders being adopted for continuous conveyance of the cargo onto the ship and each shiploader being shiftable along the berth,
    (b) an endless main conveyor for continuous delivery of cargo to the shiploaders, extending along the berth and having a first tripper at its delivery point to the first shiploader and a second tripper at its delivery point to the second shiploader, each said tripper being shiftable along the berth with its respective shiploader,
    (c) a feeding station at which cargo is delivered onto the main conveyor, the main conveyor having a first portion extending from the feeding station to the first tripper and a second portion extending from the first tripper to the second tripper, and
    (d) flow switching means associated with the first tripper for switching the cargo flow on the main conveyor without interruption between delivery to the first shiploader and delivery onto said second portion of the main conveyor for conveyance to the second tripper.

2. Ship loading system according to claim 1 wherein said flow switching means is capable of causing simultaneous delivery of the cargo to both the first shiploader and the said second portion of the main conveyor.

3. Ship loading system according to claim 1 wherein said flow switching means comprises a guide hopper having an inlet and first and second outlets, the cargo flow being delivered through the inlet by the first tripper, the first outlet delivering the cargo flow to the first shiploader and the second outlet delivering the cargo flow to the said second portion of the main conveyor, the guide hopper and the first tripper being relatively movable between first and second relative positions and the guide hopper being so shaped that in said first relative position the cargo flow passes to said first outlet and in the said second relative position the cargo flow passes to the said second outlet.

4. Ship loading system according to claim 3 wherein the guide hopper has two chute surfaces which diverge downwardly from an apex located below said inlet, and which lead respectively to said first and second outlets.

5. Ship loading system according to claim 4 wherein said first outlet of the guide hopper delivers directly onto a transverse conveyor on the first shiploader which extends outwardly over the ship.

6. Ship loading system according to claim 1 wherein the first shiploader has an inclined conveyor which receives the cargo flow from the first tripper and delivers the flow onto a transverse conveyor extending outwardly over the ship.

7. Ship loading system according to claim 1 wherein each shiploader has an inclined conveyor which receives the cargo flow from the respective tripper and delivers the flow onto a transverse conveyor extending outwardly over the ship.

8. Ship loading system according to claim 1 wherein each shiploader has a transverse conveyor extending outwardly over the ship, the position of the end of the transverse conveyor located over the ship being shiftable relative to the position of the other end so that cargo can be delivered to different parts of a hold of the ship or to different holds.

9. Ship loading system according to claim 1 wherein each shiploader is capable of slewing movement.

10. Ship loading system according to claim 1 which is provided on an elongate quay having ship's berths on both sides, wherein each said shiploader is capable of slewing movement through at least 180° whereby the shiploaders can load ships on either side of the quay.

11. In a ship loading system for bulk cargo, having at least two shiploaders for continuous conveyance of the cargo onto the ship and a conveyor system for delivery to the shiploaders, the improvement that the shiploaders are both shiftable along the ship's berth, and the conveyor system comprises an endless main conveyor extending along the ship's berth and having a first tripper at its delivery point to the first shiploader and a second tripper at its delivery point to the second shiploader, a first portion of the conveyor extending to the first tripper and a second portion extending therefrom to the second tripper, the trippers being shiftable along the ship's berth with the respective shiploaders, and at the first tripper the flow on the main conveyor being switchable without interruption between delivery to the first shiploader and delivery onto the said second portion for conveyance to the second tripper.

* * * * *